(12) United States Patent
Noh et al.

(10) Patent No.: US 7,747,548 B2
(45) Date of Patent: Jun. 29, 2010

(54) METHOD OF AND SYSTEM FOR EVALUATING TACTILE SENSATIONS OF CAR SEAT COVERS USING STATISTICAL RECURSIVE AND ARTIFICIAL NEURAL NETWORK MODELS

(75) Inventors: Jung Gyun Noh, Hwaseong-si (KR); Ki Youn Jeong, Hwaseong-si (KR); Joo Yong Kim, Seoul (KR); Baek Soung Park, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 1233 days.

(21) Appl. No.: 11/302,406

(22) Filed: Dec. 12, 2005

(65) Prior Publication Data

US 2007/0085826 A1    Apr. 19, 2007

(30) Foreign Application Priority Data

Oct. 17, 2005   (KR) ...................... 10-2005-0097296

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. ...................................... 706/15
(58) Field of Classification Search ............... 706/15
See application file for complete search history.

(56) References Cited

FOREIGN PATENT DOCUMENTS

TW            252170 A    *    7/1995

OTHER PUBLICATIONS

Hur, Y. et al. "Evaluation of Comfort Properties with Covering Textiles of Car Seats", SAE Technical Paper Series 980654, International Congress and Exposition Detroit, Michigan Feb. 23-26, 1998.*

* cited by examiner

*Primary Examiner*—Donald Sparks
*Assistant Examiner*—Li-Wu Chang
(74) *Attorney, Agent, or Firm*—Morgan, Lewis & Bockius LLP (57) ABSTRACT

Disclosed herein is a method of and system for evaluating tactile sensations of car seat covers using an artificial neural network, in which mechanical and thermal/physiological characteristics of the seat covers is measured with a measuring system, the physical quantity of the measured characteristics is acquired, and then the acquired physical quantity is converted into the amount of tactile qualities which a person feels using a statistical recursive model, thereby quantitatively evaluating tactile sensations of sticky, soft, elastic, coolness to the touch, and thermal and humid in case of car seat covers made of leather, and tactile sensations of soft, elastic, voluminous, smooth, coolness to the touch, and thermal and humid in case of car seat covers made of cloth, as well as quantitatively evaluating tactile sensations of sporty and high-class of the leather and cloths using an artificial neural network model.

10 Claims, 10 Drawing Sheets

Select Fabric

Cloth
- B [____] gfcm²/cm (Bending rigidity)
- RB [____] % (Bending resilience)
- RT [____] % (Tensile resilience)
- RC [____] % (Compression resilience)
- To [____] mm (0.5g/cm Thickness)
- SMD [____] (Surface roughness)
- $q_{max}$ [____] J/cm²sec (Maximum value of initial heat flux)
- p [____] mg/cm²/h (Moisture vapor permeability)

Option
- ● Cloth  Check
- ○ Leather

Click

[Calculate]

[Refresh]

[Exit]

Leather
- S [____] mm (Softness)
- μ [____] (Sliding resistance coefficient)
- $q_{max}$ [____] J/cm²sec (Maximum value of initial heat flux)
- p [____] mg/cm²/h (Moisture vapor permeability)
- RB [____] % (Bending resilience)
- RT [____] % (Tensile resilience)

METHOD OF AND SYSTEM FOR EVALUATING TACTILE SENSATIONS OF CAR SEAT COVERS USING STATISTICAL RECURSIVE AND ARTIFICIAL NEURAL NETWORK MODELS

This application is based on, and claims priority to Korean Patent Application No. 10-2005-0097296, filed on Oct. 17, 2005, the disclosure of which is hereby incorporated by reference.

TECHNICAL FIELD

The disclosed embodiments relates generally to seating in automobiles, and more particularly, to a method of and system for evaluating tactile sensations of car seat covers using an artificial neural network.

BACKGROUND

As part of the current trend toward luxury cars, there is a desire to improve the comfort of the drivers and passengers of a car, similar to the desire to improve the performance of a car. A car seat is where a person comes into direct contact with the car. As a result, the car seat is a critical amenity that determines the comfort of a person riding in a car.

When evaluating the comfort of a person riding in a car, both the effect of the ergonomic design elements of the car seat, such as the shape of the car seat, impact resilience of foam, etc., and the effect of the tactile sensations of the car seat covers must be considered.

The evaluation of the effect of the ergonomic design elements of car seats is carried out relatively quantitatively. Whereas, the evaluation of the effect of tactile sensations of car seat covers has been conducted based on a subjective evaluation method led by an expert assessment group.

Since the evaluation of the effect of tactile sensations of car seat covers is subjective, it can provide more information than other evaluation methods, but its evaluation results may vary depending on the subjectivity of individual evaluators. The results may also vary depending on the circumstances of the evaluation, despite identical evaluators.

Accordingly, the conventional subjective evaluations performed by the professional evaluators embrace several problems. For example, it is difficult to evaluate the characteristics of the car seat covers using a uniform criterion in the quality assessment step and the product development step based on tactile sensations of car seat covers. The lack of a uniform criterion further leads to reliability issues.

SUMMARY

To accomplish the above objects, according to one aspect of the present invention, there is provided a method of evaluating tactile sensations of car seat covers using an artificial neural network, the method comprising the steps of:

identifying a type of the car seat cover;

obtaining values for one or more physical characteristic factors of the car seat cover in accordance with the identified type of the car seat cover;

quantitatively evaluating a first set of tactile sensations with regard to the car seat cover, including determining quantitative numerical values of the first set of tactile sensations based on the obtained mechanical and thermal/physiological characteristic factors using a statistical recursive model;

grading the mechanical and thermal/physiological characteristic factors and the quantitative numerical values of the first set of tactile sensations, yielding a first set of grades;

quantitatively evaluating a second set of tactile sensations with regard to the car seat cover, including setting the quantitative numerical values of the first set of tactile sensations as input values, subjecting the set input values to an artificial neural network model, and determining quantitative numerical values of the second set of tactile sensations;

grading the quantitative numerical values of the second set of tactile sensations, yielding a second set of grades; and displaying the first and second sets of grades.

According to another aspect, there is also provided a system for evaluating tactile sensations of car seat covers using an artificial neural network, the system comprising:

means for dividing the type of the car seat covers into leather and cloth;

means for obtaining mechanical and thermal/physiological characteristic factors of the seat covers different depending on the divided type of the seat covers;

first evaluation means for quantitatively evaluating tactile sensations of Leather Soft ($L_S$), Leather Elastic ($L_E$), Leather Sticky ($L_K$), Leather, Coolness to the touch ($L_C$), and Leather thermal and humid ($L_H$) in case of car seat covers made of leather, and tactile sensations of Cloth Soft ($C_S$), Cloth Elastic ($C_E$), Cloth Voluminous ($C_V$), Cloth Smooth ($C_S$), Cloth Coolness to the touch ($C_C$), and Cloth thermal and humid ($C_H$) in case of car seat covers made of cloth to thereby yield quantitative numerical values of the tactile sensations in case of both leathers and cloths, respectively, based on the obtained mechanical and thermal/physiological characteristic factors using a statistical recursive model;

second evaluation means for quantitatively evaluating tactile sensations of sporty and high-class of the leathers and cloths by males and females finally to thereby yield quantitative numerical values of the tactile sensations, based on the quantitative numerical values of the tactile sensations yielded in the first evaluation means using a multi-layer perception (MLP) artificial neural network model;

means for grading the quantitative numerical values of the tactile sensations yielded in the first and second evaluation means, respectively; and means for representing the evaluation results of the tactile sensations.

BRIEF DESCRIPTION OF THE DRAWINGS

For a better understanding of the disclosed embodiments, reference should be made to the following detailed description with the accompanying drawings, in which.

DETAILED DESCRIPTION

Definition of Terminologies

Unless defined otherwise, all technical and scientific terms used herein have the same meanings as commonly understood by one of ordinary skill in the art to which the disclosed embodiments pertain.

The meanings of respective vocabularies used for representing tactile sensations of car seat covers employed in the disclosed embodiments are as follows:

In case of car seat covers made of leather, 'soft' is a sensation of being pliable but not smooth on the surface, 'elastic' is a sensation of being capable of recovering size and shape after deformation, 'sticky' is a feeling of being not pulled against its surface due to a high resistance to surface friction occurring when coming in contact with its surface. Further, 'coolness to the touch' is a sensation of being cool when there is a close contact between a passenger's body and the leather surface, and 'thermal and humid' is a feeling of being unpleasant or disagreeable with regard to temperature and moisture.

Also, in case of car seat covers made of cloth, 'soft' is a sensation of being pliable wholly, but not smooth on the surface, 'elastic' is a sensation of being capable of recovering size and shape after deformation, 'smooth' is a feeling of being soft on the surface. Further, 'voluminous' is a sensation of being flossy while being abundant when there is a close contact between a passenger's body and the cloth surface, 'coolness to the touch' is a sensation of being cool when there is a close contact between a passenger's body and the cloth surface, and 'thermal and humid' is a feeling of being unpleasant or disagreeable with regard to temperature and moisture.

Here, the characteristic factors to be measured for the sake of evaluation for tactile sensations of car seat covers according to the disclosed embodiments will be defined below.

(1) Characteristic Factor $\mu$ $\mu$ is a sliding resistance coefficient, which is a value representative of a degree of sliding resistance due to a viscoelastic behavior between a person's hands and the leather.

A test piece having a width of 90 mm and a length of 200 mm is fixed to a test panel (in some embodiments, an acrylic panel is used) with a smooth surface, a sliding plate having a width of 4 mm, a length of 8 mm and a weight of 40 g is placed on the surface of the test piece, the sliding plate corresponding to a sliding weight. On the bottom side of the sliding plate is attached an elastic material and a standard frictional cotton fabric is attached on the bottom side of the elastic material for the purpose of uniform distribution of pressure on the test piece. The is tilted at a certain speed so as to record an angle where the sliding plate starts to move.

In this case, after the angle measurement has been made for one test piece ten times, the maximum and minimum angle values are dropped and a tan $\theta$ value of an average angle of the remaining angle values is obtained. At this time, the obtained tan $\theta$ value is rounded off to four decimal places and then truncated at three decimal places to thereby obtain a final value, which becomes the sliding resistance coefficient $\mu$.

(2) Characteristic Factor S

S denotes a softness value measured by an ST300 Analogue Leather Softness Tester.

(3) Characteristic Factor RB

RB denotes a bending resilience (%) that is the degree of recovery against bending which is measured by KES-FB2.

That is, RB is a value obtained by observing a change in the bending moment due to a certain curvature variation (0.50 cm$^{-1}$/sec) between 2.5 and 2.5 (cm$^{-1}$), i.e., a range of a curvature k.

(4) Characteristic Factor RT

RT represents a tensile resilience (%) that is the degree of resilient recovery, which is measured by KES-FB1.

(5) Characteristic Factor SMD

SMD represents a roughness of the surface of the seat covers, which is measured by KES-FB4.

(6) Characteristic Factor B

B means a bending rigidity (gf cm$^2$/cm) that is a bending property, which is measured by KES-FB2.

(7) Characteristic Factor RC

RC means a compression resilience that is the degree of compression recovery, which is measured by KES-FB3.

(8) Characteristic Factor To

To denotes a thickness of seat covers measured under a pressure of 0.5 g/cm$^2$, which is measured by KES-FB3.

(9) Characteristic Factor $q^{max}$ $q^{max}$ denotes a maximum value of initial heat flux (J/cm$^2$·sec), that is the amount of instantaneously absorbed heat of leather, which is measured by KES-F7.

(10) Characteristic Factor P

P represents a moisture vapor permeability (mg/cm$^2$/hr) or breathability that is the ability to transmit water vapor, which is measured by KS M 6886 (calcium chloride method).

Now, a system for evaluating tactile sensation of car seat covers according to the disclosed embodiments will be described in detail hereinafter.

Figure 1:
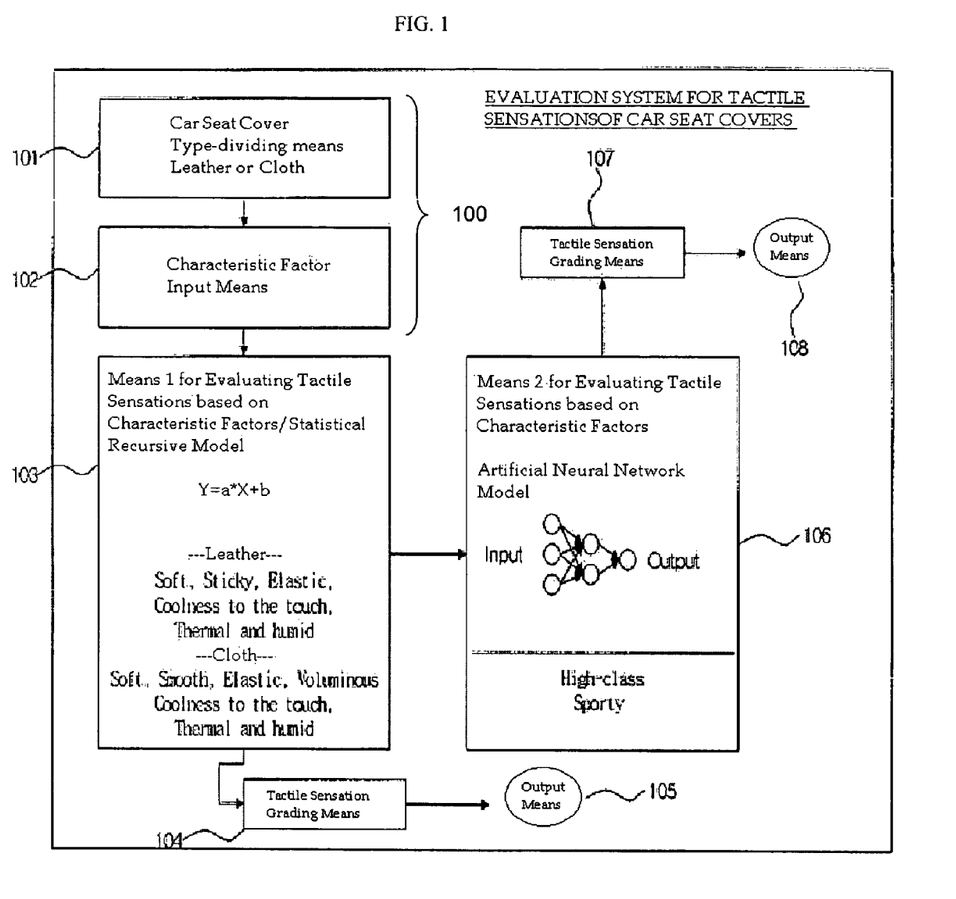
FIG. 1 is a block diagram illustrating the inner construction of a system for evaluating tactile sensations of car seat covers using an artificial neural network according to some embodiments.

FIG. 1 is a block diagram illustrating the inner construction of a system for evaluating tactile sensations of car seat covers using an artificial neural network according to the disclosed embodiments.

Referring to FIG. 1, there is shown a system for evaluating tactile sensations of car seat covers according to the disclosed embodiments which includes an input section 100, first and second evaluation means 103 and 106, first and second grading means and output means 105 and 108.

Figure 4A:
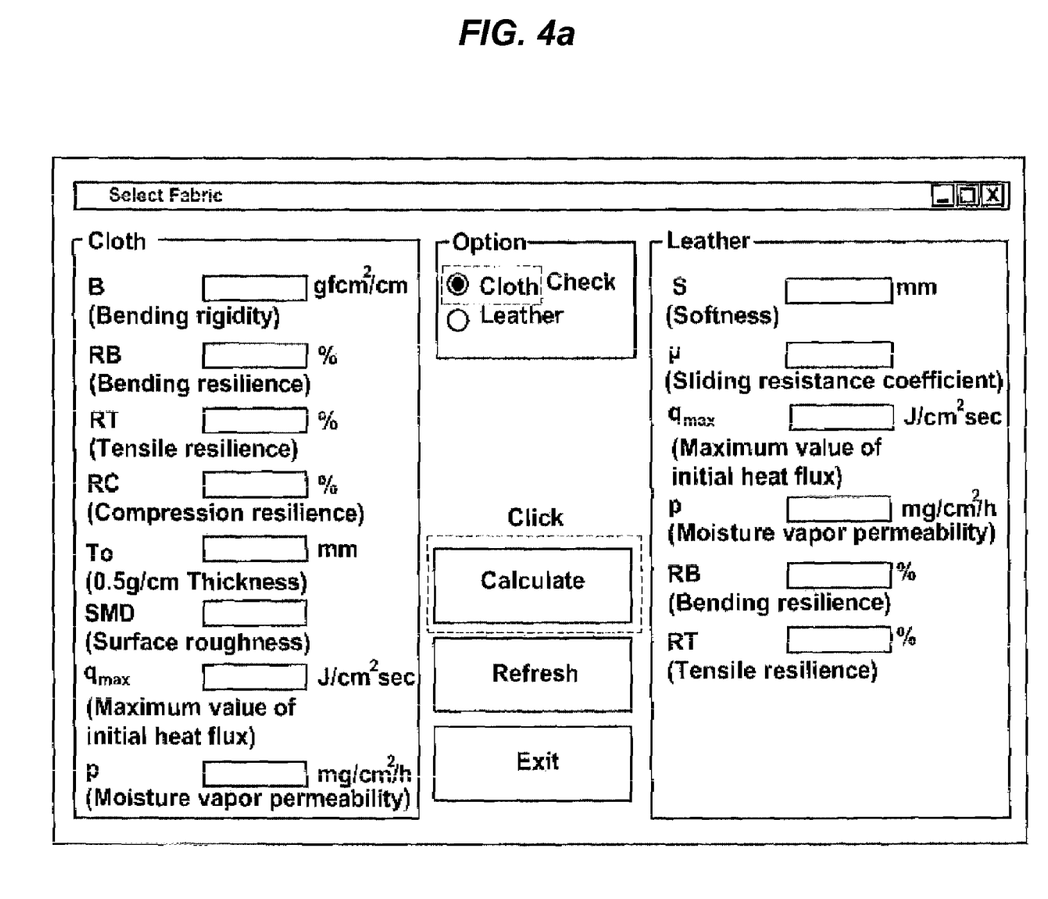
FIGS. 4a and 4b are a capture screen showing an actual use example of a system that adopts the method of evaluating tactile sensations of car seat covers according to some embodiments.
Figure 4B:
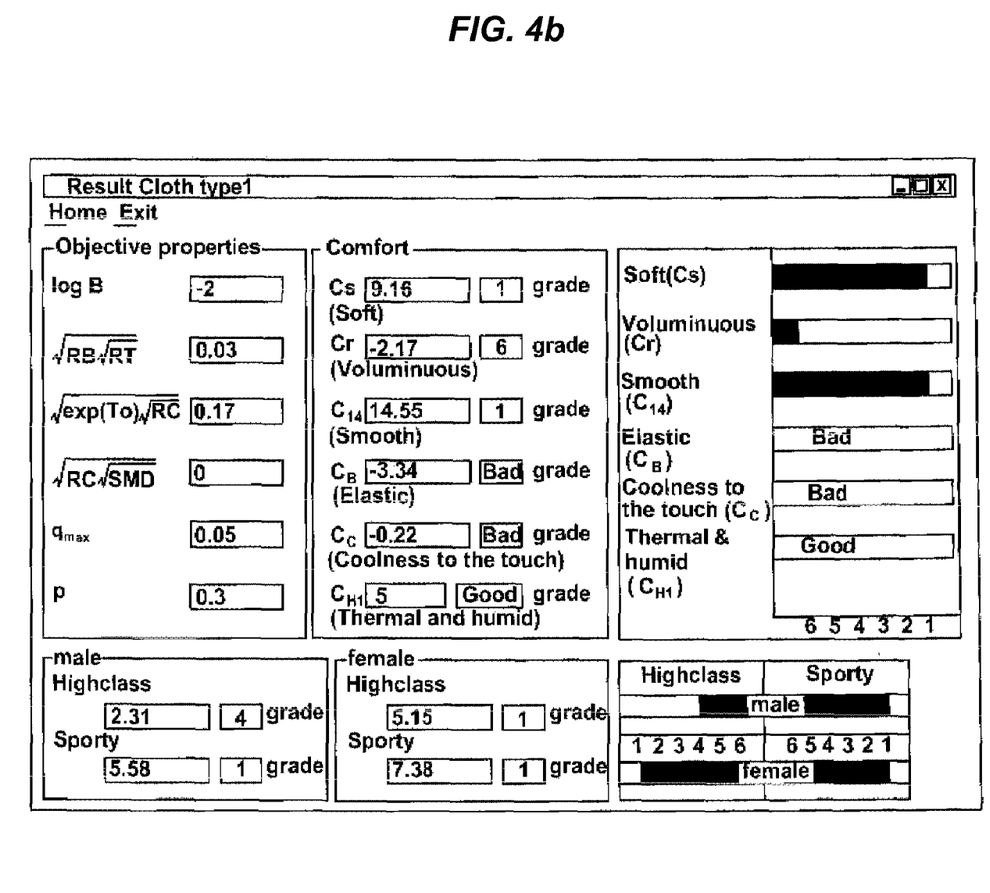

The input section 100 is composed of means 101 for dividing/selecting the type of the car seat covers into leather and cloth, and means 102 for obtaining mechanical and thermal/physiological characteristic factors (or more generally, physical characteristic factors) of the seat covers in accordance with the selected type of the seat covers and inputting the obtained mechanical and thermal/physiological characteristic factors of the seat covers. More generally, the means 102 obtains physical characteristic factors, examples of which are mechanical and thermal/physiological characteristic factors, in accordance with the selected type of car seat cover and inputting the obtained values for the characteristic factors. In some embodiments, the means 101 for selecting the type of car seat cover may be an input device such as a keyboard or mouse, with which a user may manually select leather or cloth from an application such as the one shown in FIG. 4a.

In some embodiments, the means 102 for obtaining the characteristic factors may also be an input device, with which a user may manually input values for the mechanical and thermal/physiological characteristic factors obtained from apparatuses that determine such values. Such apparatuses may include devices well-known to one of ordinary skill in the art for measuring any of the characteristic factors described above. In some other embodiments, the means 102 may be an interface, such as an input port, that receives the characteristic factor values directly from the apparatuses that measure such values.

The first evaluation means 103 functions to evaluate tactile sensations of the seat covers based on the characteristic factors. Specifically, the first evaluation means 103 is adapted to quantitatively evaluate tactile sensations of Leather Soft ($L_S$), Leather Elastic ($L_E$), Leather Sticky ($L_K$), Leather Coolness to the touch ($L_C$), and Leather thermal and humid ($L_H$) in case of car seat covers made of leather, and tactile sensations of Cloth Soft ($C_S$), Cloth Elastic ($C_E$), Cloth Voluminous ($C_V$), Cloth Smooth ($C_S$), Cloth Coolness to the touch ($C_C$), and Cloth thermal and humid ($C_H$) in case of car seat covers made of cloth to thereby yield quantitative numerical values of the tactile sensations in case of both leathers and cloths, respectively, based on the inputted mechanical and thermal/physiological characteristic factors using a statistical recursive model.

In some embodiments, the first evaluation means 103 includes a computer configured to receive the characteristic factor values and to determine, from the characteristic factor values, quantitative numerical values of the tactile sensations using a statistical recursive model.

The second evaluation means 106 is adapted to quantitatively evaluate tactile sensations of sporty and high-class of the leather and cloth seat covers by males and females to thereby yield quantitative numerical values of the tactile sensations, based on the quantitative numerical values of the tactile sensations yielded in the first evaluation means 103 using an artificial neural network model. In some embodiments, the second evaluation means 106 includes a computer configured to receive the quantitative numerical values of the tactile sensations yielded in the first evaluation means 103 and to determine from these values quantitative numerical values of the tactile sensation of "sporty" and "high-class" as perceived by males and females using an artificial neural network model.

The first grading means 104 is adapted to grade the quantitative numerical values of the tactile sensations yielded in the first evaluation means 103 into grades ranging from 1 to 6, the second grading means 107 is adapted to grade the quantitative numerical values of the tactile sensations yielded in the second evaluation means 106 into grades ranging from 1 to 6. In some embodiments, the first grading means 104 and the second grading means 107 may each include a computer configured to grade the respective quantitative numerical values.

The output means 105 is adapted to visually represent the quantitative numerical values of the tactile sensations graded into six grades in the first grading means 104 in the form of graphs or other manners of visually presenting data, and the output means 108 is adapted to visually represent the quantitative numerical values of the tactile sensations graded into six grades in the second grading means 104 in the form of graphs or other manners of visually presenting data. In some embodiments, the output means 105, 108 include a display device, such as a monitor.

Figure 9:
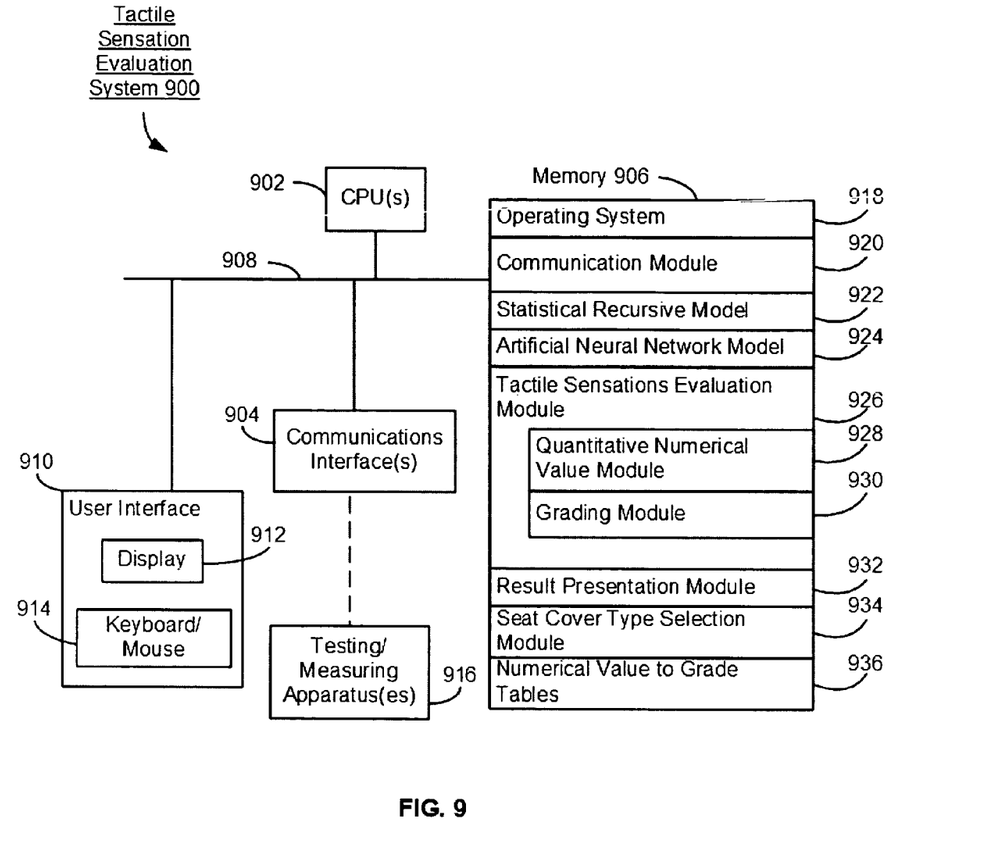
FIG. 9 is a block diagram illustrating a system for evaluating tactile sensations of car seat covers using an artificial neural network according to some embodiments.

In some embodiments, the first evaluation means 103, the second evaluation means 106, the first grading means 104, the second grading means, and output means 105, 108 may be embodied in a single computer. The single computer may include one or more central processing units (CPUs); memory with modules, programs, or instructions for performing the functions described above; one or more communications interfaces (optional), which may be used to interface with apparatuses that measure values for the characteristic factors; a user interface (optional), which may include a display device, a keyboard, and/or a mouse; and communication buses that couple these components. In some other embodiments, the first evaluation means 103, the second evaluation means 106, the first grading means 104, the second grading means, and output means 105, 108 may be embodied in a distributed computer system. An exemplar of the single computer or distributed computer system is shown in FIG. 9, further details of which are described below.

Figure 2:
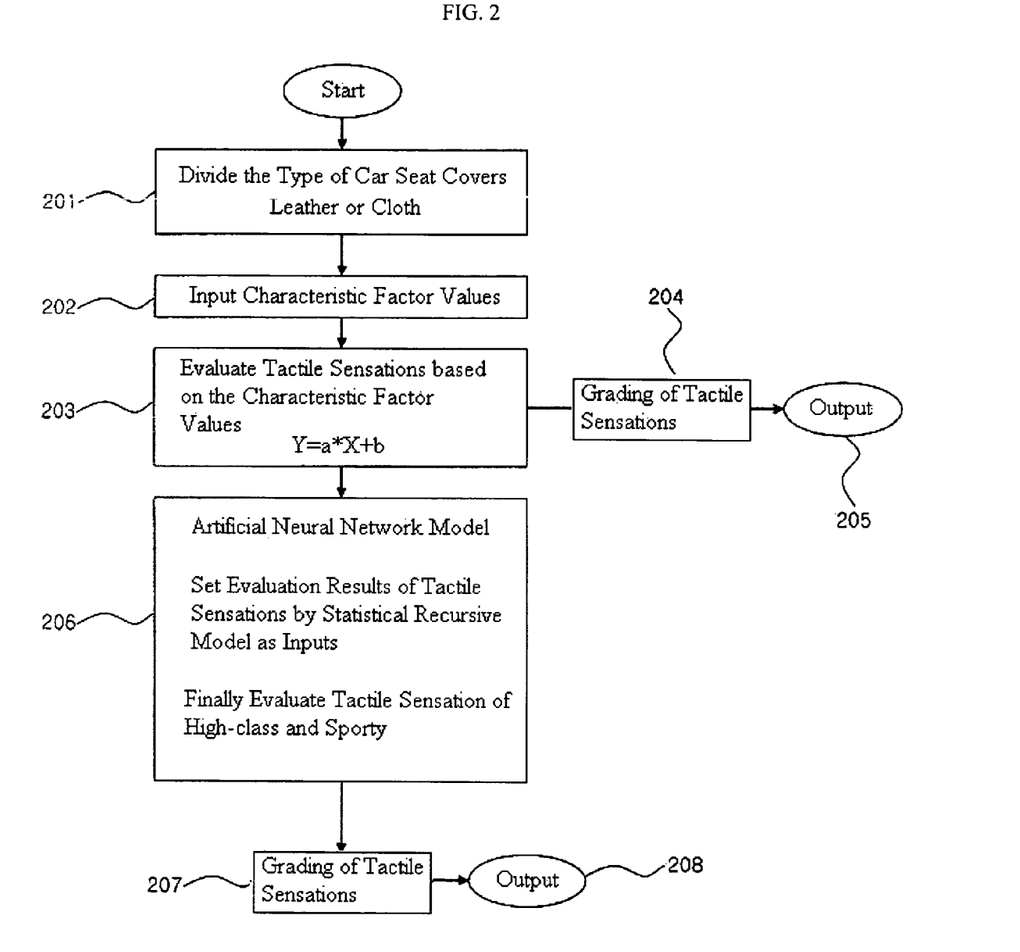
FIG. 2 is a flowchart illustrating a process of evaluating tactile sensations of car seat covers using an artificial neural network according to some embodiments.
Figure 3:
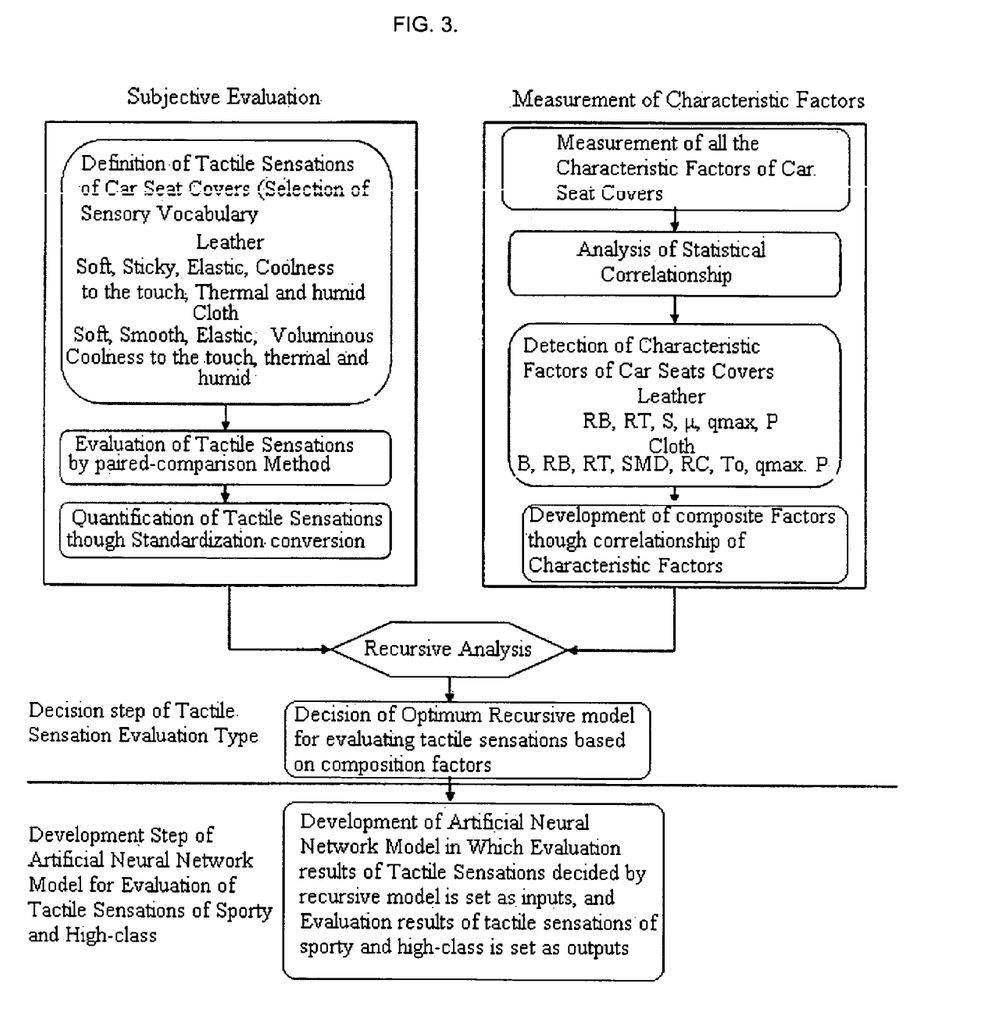
FIG. 3 is a schematic diagrammatic view illustrating a process of determining a statistical recursive model and an artificial neural network model through the result of a subjective evaluation for tactile sensations of car seat covers and the measurement of objective characteristics of the car seat covers according to some embodiments.

Now, an evaluation method for tactile sensations of car seat covers implemented by the evaluation system for tactile sensations of the car seat covers according to the disclosed embodiments will be described in detail hereinafter with reference to FIGS. 2 and 3.

The evaluation for tactile sensations of the car seat covers according to the disclosed embodiments includes selecting the tactile sensation factors of all kinds of seat covers for vehicles used at home and abroad through both subjective evaluation and characteristic factor measurement. As shown in FIG. 3, sticky, soft, elastic, coolness to the touch, and thermal and humid are selected in case of leathers; and soft, elastic, voluminous, smooth, coolness to the touch, and thermal and humid are selected in case of cloths as vocabularies used for expressing tactile sensations of the car seat covers through a series of processes such as a questionnaire, an integration of similar vocabularies, a concrete embodiment of meanings of related terms, etc.

At this time, the selected tactile sensation factors is performed by evaluating the tactile sensations through a paired-comparison method (a method in which persons touch seat covers as an object to be evaluated in person) known as the most accurate sensory evaluation method. Then, the evaluated tactile sensations are quantified by a statistical standardization conversion.

In addition, by measuring mechanical and thermal/physiological characteristic factors having an effect on tactile sensations of the seat covers with a measuring instrument, and taking into consideration both the correlation between the respective characteristic factors and the quantified tactile sensations, among all kinds of seat covers for vehicles used at home and abroad, six characteristic factors such as S, $\mu$, RB, RT, P and $q_{max}$ are detected in case of leathers and then are automatically converted into characteristic factors such as S, $\mu$, $$\sqrt{RB\sqrt{RT}},$$

log p and $q_{max}$ for the sake of development of a statistical recursive model.

Also, eight characteristic factors such as SMD, RB, RT, B, RC, To, $q_{max}$ and p are detected in case of cloths and then are converted into characteristic factors such as $$\sqrt{RC\sqrt{SMD}}, \sqrt{RT\sqrt{RB}}, \log B, \sqrt{\exp T_O \sqrt{RC}},$$

$q_{max}$ and log p for the sake of development of a statistical recursive model.

Accordingly, through a statistical recursive analysis of the aforementioned standardization converted tactile sensation numerical values and the respective characteristic factors, the statistical recursive model of the following Expressions (1) through (11) for evaluation of tactile sensations of leathers and cloths is derived from the mechanical and thermal/physiological characteristics factors of car seat covers:

1. In Case of Leathers

Leather Soft($L_S$)=−8.5567+3.0429×S; (1)

$$\text{Leather Elastic } (L_E) = -9.8916 + 0.67713 \times \sqrt{RB\sqrt{RT}} \quad (2)$$

Leather Sticky($L_K$)=−5.1694+15.664×μ, (3)

Leather Coolness to the touch($L_C$)=−6.751+46.519× $q_{max}$ (4)

Leather thermal and humid($L_H$)=2.0589−2.2927×log p. (5)

2. In Case of Cloths

Cloth Soft($L_S$)=2.4923−3.2303×log B (6)

$$\text{Cloth Elastic } (C_E) = -6.2558 + 0.51146 \times \sqrt{RT\sqrt{RB}} \quad (7)$$

$$\text{Cloth Voluminous } (C_V) = -2.2679 + 0.60339 \times \sqrt{\exp T_O \sqrt{RC}} \quad (8)$$

$$\text{Cloth Smooth } (C_S) = 14.241 - 1.02 \times \sqrt{RC\sqrt{SMD}} \quad (9)$$

Cloth Coolness to the touch($C_C$)=−2.203+37.062× $q_{max}$ (10)

Cloth thermal and humid($C_H$)=3.4037−1.3855×log p. (11)

The derived expressions of the statistical recursive model, described above, may then be used to quantitatively evaluate the tactile sensations for a particular car seat cover, leather or cloth, by merely measuring the corresponding physical characteristic factors for the car seat cover and then inserting the measured values of these characteristic factors into the expressions.

It should be appreciated that the expressions (1) thru (11) above are merely exemplary. The actual expressions derived from a statistical recursive analysis of the quantified, converted tactile sensation values and the respective physical characteristic factors may vary from those describe above based on the actual data that is gathered and used to derive the expressions.

A car seat cover may also be classified as "high-class" or "sporty". "Sporty," in some embodiments, means that the car seat cover is perceived as associated with a sports car. "High-class," in some embodiments, means that the car seat cover is perceived as associated with a high-class, luxury car. Taking the quantitative evaluation of tactile sensations for car seat covers further, car seat covers may also be quantitatively evaluated for whether they are high-class or sporty. An artificial neural network model is first derived in order to quantitatively evaluate seat covers for the sensations of "high-class" and "sporty."

Since males and females may have different feelings regarding whether a car seat cover, leather or cloth, is "high-class" or "sporty," the tactile sensations of "high-class" and "sporty" are evaluated separately by males and females through a sensory evaluation method such as the above-mentioned tactile sensation evaluation method and then a criterion for quantification of tactile sensations is set. That is, the tactile sensations of high-class and sporty of leathers and cloths are evaluated through a paired-comparison method, and then the evaluated tactile sensations are quantified by a statistical standardization conversion.

Figure 5:
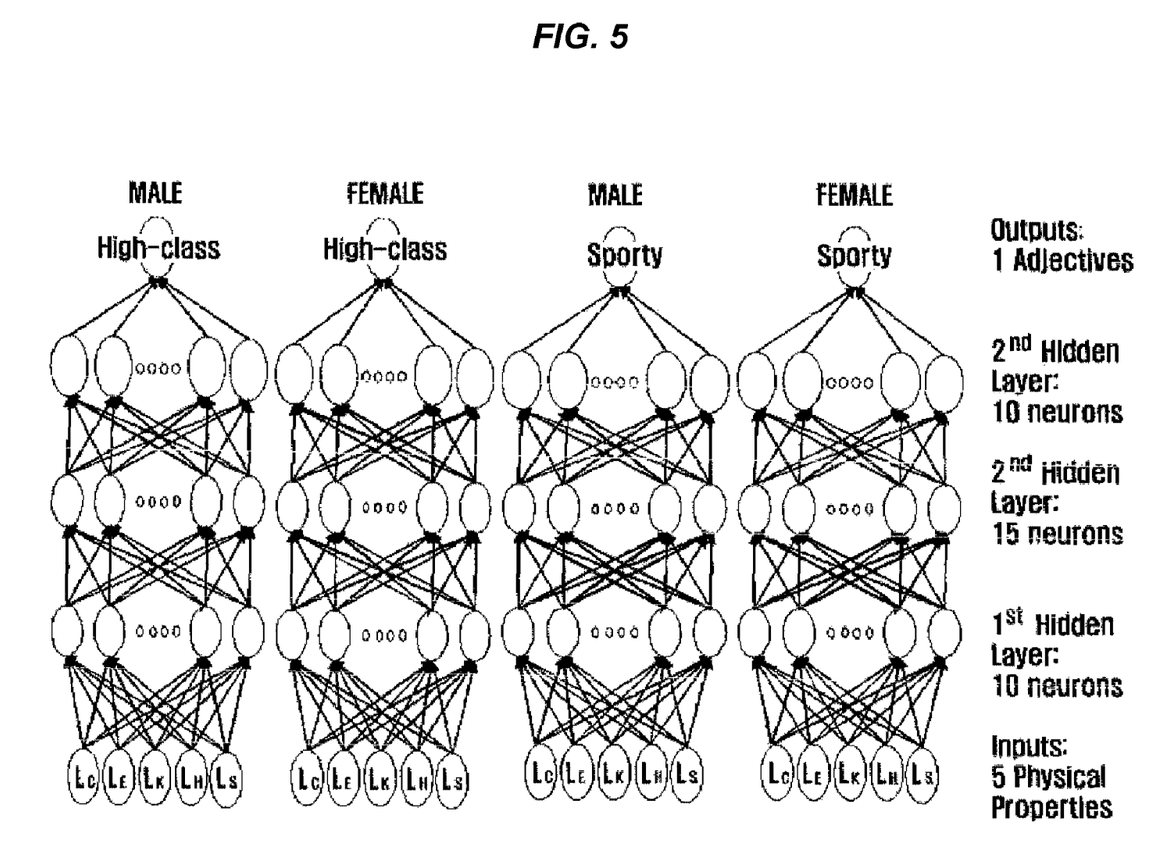
FIG. 5 is a schematic diagram of an MLP artificial neural network model used for evaluating tactile sensations of sporty and high-class of leathers in a method of and system for evaluating tactile sensations of car seat covers according to some embodiments.
Figure 6:
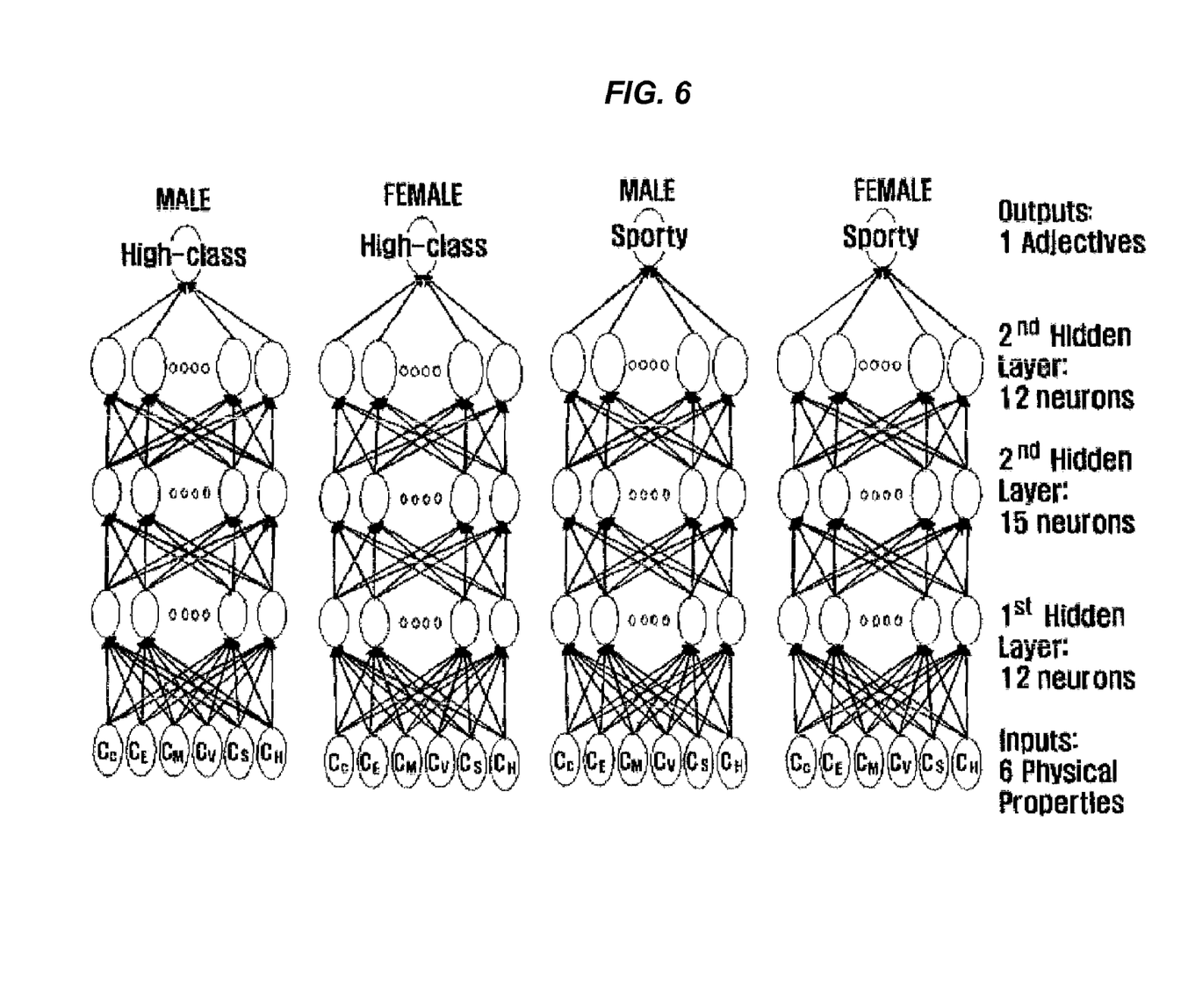
FIG. 6 is a schematic diagram of an MLP artificial neural network model used for evaluating tactile sensations of sporty and high-class of cloths in a method of and system for evaluating tactile sensations of car seat covers according to some embodiments.

Accordingly, as shown in FIGS. 5 and 6, there is configured an artificial neural network model in which the quantitative numerical values of the tactile sensations of car seat covers are set as input values and the quantitative numerical values of the tactile sensations of sporty (males/females) and high-class (males/females) of the leathers and cloths are set as output values using a statistical recursive model of the aforementioned statistical recursive model Expressions (1) to (11). Using the quantitative numerical values of the tactile sensations (obtained by measuring for the physical characteristic factors and inserting the measured values into the statistical recursive model) for a test set of car seat covers as the input and the quantified "high-class" or "sporty" evaluations for the same test set as the output, an artificial neural network model may be derived. The derived artificial neural network model may be used to quantitatively evaluate a particular seat cover for whether it is "high-class" or "sporty" with regard to males and females.

The grades of the evaluated tactile sensations (tactile sensations of Leather Soft ($L_S$), Leather Elastic ($L_E$), Leather Sticky ($L_K$), Leather Coolness to the touch ($L_C$), and Leather thermal and humid ($L_H$) in case of car seat covers made of leather, and tactile sensations of Cloth Soft ($C_S$), Cloth Elastic ($C_E$), Cloth Voluminous ($C_V$), Cloth Smooth ($C_S$), Cloth Coolness to the touch ($C_C$), and Cloth thermal and humid ($C_H$) in case of car seat covers) of the car seat covers are divided at equal intervals on a basis of a point of subjective equality (PSE), i.e., a minimum difference of stimulus intensity by a psychophysical evaluation method.

The psychophysical method refers to one of a number of experimental methods, in which psychological phenomena of sensation and perception responsive to a physical stimulus is expressed as a mathematical function, and the relationship between the psychological phenomena and the mathematical function is studied quantitatively. Such a psychophysical method is classified into a method of adjustment, a method of limit and a method of constant.

In the psychophysical method, a stimulus threshold is a value of decision probability of 50%, and a discrimination threshold is a physical energy that can identify the larger of two stimuli or that the two stimuli are equal to each other, etc., at a probability of 50%.

The method of constant stimuli adopted in the disclosed embodiments randomly suggests stimulus values of several predetermined steps to measure the response to the stimuli in a binary notation or ternary notation, whereas the method of adjustment and the method of limit sequentially suggest stimulus values so that a prediction is possible. Therefore, since the method of constant stimuli adopted in the disclosed embodiments randomly suggests stimuli, it enables an accurate prediction and is regarded as a method covering the widest application range.

Figure 7:
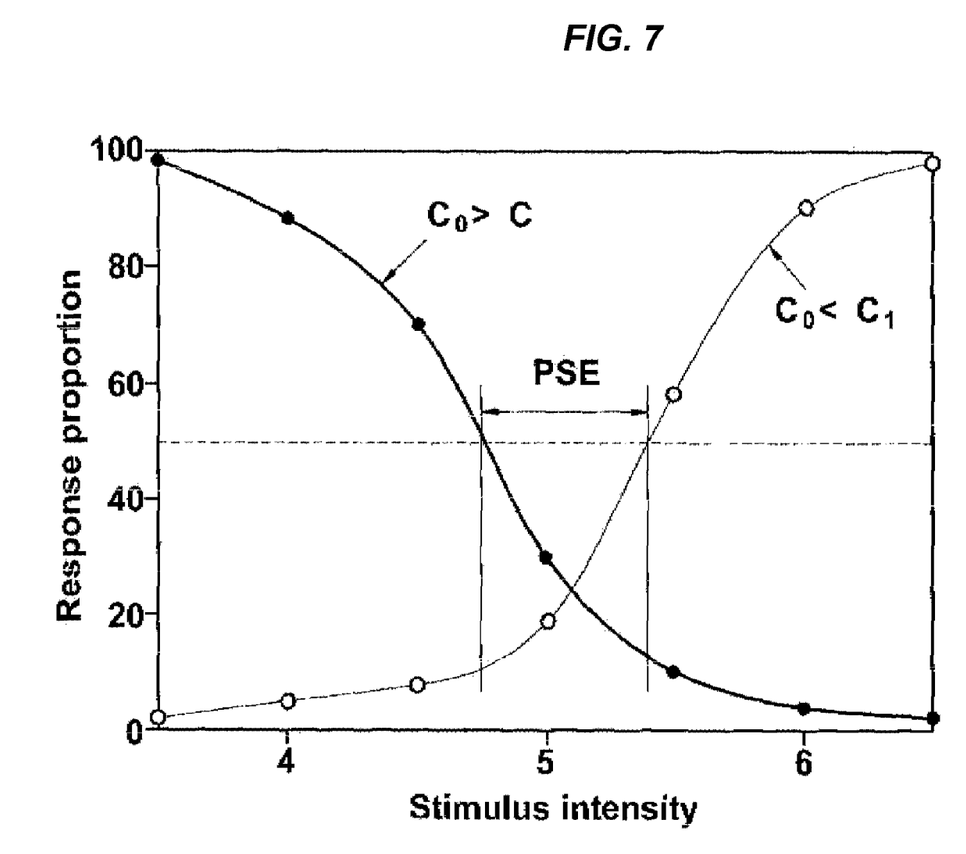
FIG. 7 is a graph illustrating an example of a function of finding a point of subjective equality (PSE), i.e., a minimum difference of stimulus intensity by psychophysical evaluation.
Figure 8:
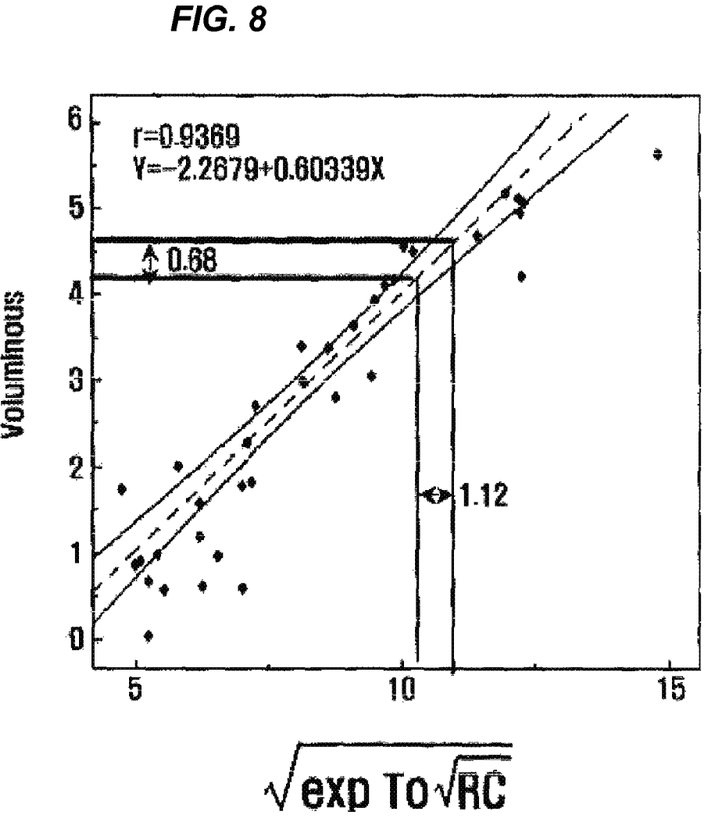
FIG. 8 is a graph illustrating an example of the grading of tactile sensations based on the PSE according to some embodiments.

FIG. 7 is a graph illustrating an example of a function of finding a point of subjective equality (PSE), i.e., a minimum difference of stimulus intensity by psychophysical evaluation, and FIG. 8 is a graph illustrating an example of the grading of tactile sensations based on the PSE according to the disclosed embodiments.

Accordingly, the numerical values of the tactile sensations of the car seat covers can be expressed in grades ranging from 1 to 6 or grades ranging between poor and good by the grading table of the mechanical and thermal/physiological characteristic values and the quantitative numerical values of the tactile sensations of the leathers and cloths as shown in following Tables 1 to 11.

TABLE 1

Grading of Softness(mm) and Leather Soft(Ls)

| Softness (mm) Grading of Characteristic Factor Values | | Soft (Ls) Grading of Tactile Sensation Values | |
|---|---|---|---|
| Grades | Range | Grades | Range |
| 6 | ~3.33 | 6 | ~1.62 |
| 5 | 3.34~3.62 | 5 | 1.63~2.48 |
| 4 | 3.63~3.91 | 4 | 2.49~3.34 |
| 3 | 3.92~4.20 | 3 | 3.35~4.20 |
| 2 | 4.21~4.49 | 2 | 4.21~5.06 |
| 1 | 4.50~ | 1 | 5.07~ |

TABLE 2

–Grading of $\sqrt{RB\sqrt{RT}}$ and Leather Elastic ($L_E$) –

| $\sqrt{RB\sqrt{RT}}$ Grading of Characteristic Factor Values | | Elastic ($L_E$) Grading of Tactile Sensation Values | |
|---|---|---|---|
| Grades | Range | Grades | Range |
| poor | ~1.96 | poor | ~3.58 |
| good | 1.97~ | good | 3.59~ |

TABLE 3

Grading of μ and Leather Sticky ($L_K$)

| μ Grading of Characteristic Factor Values | | Sticky ($L_K$) Grading of Tactile Sensation Values | |
|---|---|---|---|
| Grades | Range | Grades | Range |
| 6 | ~0.38 | 6 | ~1.23 |
| 5 | 0.39~0.44 | 5 | 1.24~2.02 |
| 4 | 0.45~0.50 | 4 | 2.82~3.60 |
| 3 | 0.51~0.56 | 3 | 3.61~4.39 |
| 2 | 0.57~0.62 | 2 | 4.40~5.18 |
| 1 | 0.63~ | 1 | 5.19~ |

TABLE 4

Grading of $q_{max}$ and Leather Coolness to the touch($L_C$)

| $q_{max}$ Grading of Characteristic Factor Values | | Coolness to the touch($L_C$) Grading of Tactile Sensation Values | |
|---|---|---|---|
| Grades | Range | Grades | Range |
| poor | ~0.160 | poor | ~0.738 |
| good | 0.161~ | good | 0.739~ |

TABLE 5

Grading of log p and Leather Thermal and humid($L_H$)

| log p Grading of Characteristic Factor Values | | Thermal and humid($L_H$) Grading of Tactile Sensation Values | |
|---|---|---|---|
| Grades | Range | Grades | Range |
| poor | ~0.082 | poor | ~1.868 |
| good | 0.083~ | good | 1.869~ |

TABLE 6

Grading of log B and Cloth Soft(Cs)

| log B Grading of Characteristic Factor Values | | Soft (Cs) Grading of Tactile Sensation Values | |
|---|---|---|---|
| Grades | Range | Grades | Range |
| 6 | ~−0.39 | 6 | ~2.89 |
| 5 | −0.38~−0.26 | 5 | 2.90~3.29 |
| 4 | −0.25~−0.13 | 4 | 3.30~3.69 |
| 3 | −0.12~0 | 3 | 3.70~4.09 |
| 2 | 0.01~0.13 | 2 | 4.10~4.49 |
| 1 | 0.14~ | 1 | 4.50~ |

TABLE 7

–Grading of $\sqrt{RT\sqrt{RB}}$ and Cloth Elastic ($C_E$) –

| $\sqrt{RT\sqrt{RB}}$ Grading of Characteristic Factor Values | | Elastic ($C_E$) Grading of Tactile Sensation Values | |
|---|---|---|---|
| Grades | Range | Grades | Range |
| poor | ~18.4 | poor | ~3.3 |
| good | 18.5~ | good | 3.4~ |

TABLE 8

–Grading of $\sqrt{expT_O\sqrt{RC}}$ and Cloth Voluminous ($C_V$) –

| Grading of Characteristic Factor Values | | Voluminous ($C_V$) Grading of Tactile Sensation Values | |
|---|---|---|---|
| Grades | Range | Grades | Range |
| 6 | ~8.21 | 6 | ~2.67 |
| 5 | 8.22~9.34 | 5 | 2.68~3.36 |
| 4 | 9.35~10.47 | 4 | 3.37~4.05 |
| 3 | 10.48~11.60 | 3 | 4.06~4.74 |
| 2 | 11.61~12.73 | 2 | 4.75~5.43 |
| 1 | 12.74~ | 1 | 5.14~ |

TABLE 9

Grading of $\sqrt{RC\sqrt{SMD}}$ and Cloth Smooth ($C_S$)

| $\sqrt{RC\sqrt{SMD}}$ Grading of Characteristic Factor Values | | Smooth ($C_S$) Grading of Tactile Sensation Values | |
|---|---|---|---|
| Grades | Range | Grades | Range |
| 6 | ~9.371 | 6 | ~1.83 |
| 5 | 9.372~10.297 | 5 | 1.84~2.78 |
| 4 | 10.298~11.223 | 4 | 2.79~3.73 |
| 3 | 11.224~12.149 | 3 | 3.74~4.68 |
| 2 | 12.150~13.075 | 2 | 4.69~5.63 |
| 1 | 13.076~ | 1 | 5.64~ |

TABLE 10

Grading of $q_{max}$ and Cloth Coolness to the touch($L_C$)

| $q_{max}$ Grading of Characteristic Factor Values | | Coolness to the touch($L_C$) Grading of Tactile Sensation Values | |
|---|---|---|---|
| Grades | Range | Grades | Range |
| poor | ~0.090 | poor | ~1.16 |
| good | 0.091~ | good | 1.17~ |

TABLE 11

Grading of log p and Cloth Thermal and humid($C_H$)

| log p Grading of Characteristic Values | | Thermal and humid ($C_H$) Grading of Tactile Sensation Values | |
|---|---|---|---|
| Grades | Range | Grades | Range |
| poor | ~2.353 | poor | ~0.13 |
| good | 2.354~ | good | 0.14~ |

Since it is difficult to psychophysically evaluate the grades of the tactile sensations of sporty and high-class, the ranges of the quantitative numerical values of the tactile sensations of sporty and high-class evaluated through an artificial neural network model are divided into six grades at equal intervals by males and females, respectively.

TABLE 12

Grading of High-class of Leathers

| High-class (males) Leather | | High-class (females) Leather | |
|---|---|---|---|
| Grades | Range | Grades | Range |
| 6 | ~0.34 | 6 | ~0.34 |
| 5 | 0.35~0.69 | 5 | 0.35~0.69 |
| 4 | 0.70~1.04 | 4 | 0.70~1.04 |
| 3 | 1.05~1.39 | 3 | 1.05~1.39 |
| 2 | 1.40~1.74 | 2 | 1.40~1.74 |
| 1 | 1.75~ | 1 | 1.75~ |

TABLE 13

Grading of Sporty of Leathers

| Sporty (males) Leather | | Sporty (females) Leather | |
|---|---|---|---|
| Grades | Range | Grades | Range |
| 6 | ~0.34 | 6 | ~0.34 |
| 5 | 0.35~0.69 | 5 | 0.35~0.69 |
| 4 | 0.70~1.04 | 4 | 0.70~1.04 |
| 3 | 1.05~1.39 | 3 | 1.05~1.39 |
| 2 | 1.40~1.74 | 2 | 1.40~1.74 |
| 1 | 1.75~ | 1 | 1.75~ |

TABLE 14

Grading of High-class of Cloths

| High-class (males) Cloth | | High-class (females) Cloth | |
|---|---|---|---|
| Grades | Range | Grades | Range |
| 6 | ~0.50 | 6 | ~0.67 |
| 5 | 0.51~1.00 | 5 | 0.68~1.35 |
| 4 | 1.01~1.50 | 4 | 1.36~2.02 |
| 3 | 1.51~2.00 | 3 | 2.03~2.70 |
| 2 | 2.01~2.50 | 2 | 2.71~3.38 |
| 1 | 2.51~ | 1 | 3.39~ |

TABLE 15

Grading of Sporty of Cloths

| Sporty (males) Cloth | | Sporty (females) Cloth | |
|---|---|---|---|
| Grades | Range | Grades | Range |
| 6 | ~0.67 | 6 | ~0.67 |
| 5 | 0.68~1.35 | 5 | 0.68~1.35 |
| 4 | 1.36~2.02 | 4 | 1.36~2.02 |
| 3 | 2.03~2.70 | 3 | 2.03~2.70 |
| 2 | 2.71~3.38 | 2 | 2.71~3.38 |
| 1 | 3.39~ | 1 | 3.39~ |

It should be appreciated that the Tables 1-15 described above are merely exemplary. The tables may specify grade ranges and have numerical value to grade correspondences different from those described above.

As described above, the criterion of the above Tables 1 to 15 is prepared through following steps including a step of inputting mechanical and thermal/physiological characteristic factors of the seat covers differently depending on leather/cloth, a step of quantitatively evaluating tactile sensations of the respective tactile sensation factors of the leather/cloths to thereby yield quantitative numerical values of the tactile sensations in case of both leathers and cloths, respectively, based on the inputted mechanical and thermal/physiological characteristic factors using a statistical recursive model, a step of grading the inputted mechanical and thermal/physiological characteristic factors and the yielded quantitative numerical values of the tactile sensations, respectively, a step of subjecting the yielded quantitative numerical values of the tactile sensations to an artificial neural network model so as to quantitatively evaluate tactile sensations of sporty (male/female) and high-class (male/female) of the leather and cloths to thereby yield quantitative numerical values of the tactile sensations, and a step of grading the yielded quantitative numerical values of the tactile sensations of sporty and high-class of the leather and cloths. Thereafter, the evaluation for the tactile sensations of the leather and cloths is actually conducted.

Now, a method of evaluating tactile sensations of car seat covers according to some embodiments will be described in detail hereinafter with reference to FIG. 2.

Embodiment

An exemplary embodiment is directed to a method of and system for evaluating tactile sensations which a user feels only through simple measurement of mechanical and thermal/physiological characteristic factors of the seat cover(s).

1) Step (201) of Dividing the Type of Car Seat Covers

The type of the car seat cover(s) to be evaluated is selected.

That is, leather or cloth is selected, in accordance with whatever type to which car seat cover(s) to be evaluated belongs.

2) Step (202) of Inputting Characteristic Factor Values of Car Seat Covers

The values of mechanical and thermal/physiological characteristic factors (or more generally, physical characteristic factors) of the seat cover(s) are measured by using a measurement system, which may include any testing or measuring apparatus(es) known in the art for measuring such physical characteristic factors and then are inputted.

As mentioned above, six characteristic factor values of S (Softness), μ (sliding resistance coefficient), RB (bending resilience (%)), RT (tensile resilience (%)), P (moisture vapor permeability (mg/cm$^2$/hr)) and $q^{max}$ (maximum value of initial heat flux (J/cm$^2$·sec)) in case of leathers, and eight characteristic factor values of SMD (surface roughness), RC (compression resilience), RB (bending resilience (%)), RT (tensile resilience (%)), B (bending rigidity (gf cm$^2$/cm)), To (thickness), $q^{max}$ (maximum value of initial heat flux (J/cm$^2$·sec)) and P (moisture vapor permeability (mg/cm$^2$/hr)) in case of cloths are inputted to first evaluation means for quantitatively evaluating tactile sensations of both leathers and cloths, respectively.

Then, the inputted six characteristic factor values of S, μ, RB, RT, p and $q^{max}$ are automatically converted into characteristic factors of S, μ, $$\sqrt{RB\sqrt{RT}},$$

log p and $q_{max}$ in case of leathers, and the inputted eight characteristic factor values of SMD, RC, RB, RT, B, To, $q^{max}$ and P are automatically converted into characteristic factors of as $$\sqrt{RC\sqrt{SMD}}, \sqrt{RT\sqrt{RB}}, \log B, \sqrt{\exp T_O \sqrt{RC}},$$

$q_{max}$ and log p in case of cloths, respectively.

3) Step (203) of Evaluating Tactile Sensations Using a Statistical Recursive Model The characteristic factors converted automatically after the input of mechanical and thermal/physiological characteristic factor values of the car seat covers is substituted into the above Expressions (1) to (11) of the statistical recursive model, and the tactile sensations of Leather Soft ($L_S$), Leather Elastic ($L_E$), Leather Sticky ($L_K$), Leather Coolness to the touch ($L_C$), and Leather thermal and humid ($L_H$) in case of leathers, and tactile sensations of Cloth Soft ($C_S$), Cloth Elastic ($C_E$), Cloth Voluminous ($C_V$), Cloth Smooth ($C_S$), Cloth Coolness to the touch ($C_C$), and Cloth thermal and humid ($C_H$) in case of cloths, are quantitatively evaluated, to thereby yield quantitative numerical values of the tactile sensations in case of both leathers and cloths, respectively, based on the mechanical and thermal/physiological characteristic factor values through an operational algorithm having a statistical recursive model.

4) Step (204) of Grading the Numerical Values of the Tactile Sensations

The numerical values of the tactile sensations evaluated and yielded in the tactile sensation evaluation step (203) are expressed in grades ranging from 1 to 6 or grades ranging between poor and good as shown in above Tables 1 to 11 on a basis of a point of subjective equality (PSE), i.e., a minimum difference of stimulus intensity by psychophysical evaluation method.

When it is desired to evaluate any one seat cover, the measured characteristic values and tactile sensation values of a corresponding seat cover are substituted into each of Table 1 to 11 so as to evaluate the quality of the corresponding seat cover.

5) Step (206) of Evaluating Tactile Sensations of High-Class and Sporty Using an Artificial Neural Network Model The quantitative numerical values of tactile sensations of Leather Soft ($L_S$), Leather Elastic ($L_E$), Leather Sticky ($L_K$), Leather Coolness to the touch ($L_C$), and Leather thermal and humid ($L_H$) in case of the leathers, and the quantitative numerical values of tactile sensations of Cloth Soft ($C_S$), Cloth Elastic ($C_E$), Cloth Voluminous ($C_V$), Cloth Smooth ($C_S$), Cloth Coolness to the touch ($C_C$), and Cloth thermal and humid ($C_H$) in case of the cloths, which are evaluated and yielded through the statistical recursive model, are inputted to the second evaluation means 106 having an artificial neural network model. At this time, in case of leathers, the second evaluation means 106 quantitatively evaluates tactile sensations of sporty and high-class by males and females to thereby yield quantitative numerical values of the tactile sensations by using an artificial neural network model. In some embodiments, that artificial neural network model is a multi-layer perception (MLP) artificial neural network model consisting of five layers including one input layer having five neurons, three hidden layers each having ten, fifteen and ten neurons, and one output layer having one neuron as shown in FIG. 5.

Similarly, in case of cloths, the second evaluation means 106 quantitatively evaluates tactile sensations of sporty and high-class by males and females finally to thereby yield quantitative numerical values of the tactile sensations by using an artificial neural network model. In some embodiments, that artificial neural network model is a multi-layer perception (MLP) artificial neural network model consisting of five layers including one input layer having six neurons, three hidden layers each having twelve, fifteen and twelve neurons, and one output layer having one neuron as shown in FIG. 6.

6) Step (207) of Grading the Tactile Sensations of High-Class and Sporty

The quantitative numerical values of the tactile sensations evaluated and yielded at step (206) of evaluating tactile sensations of High-class and Sporty using the artificial neural network model are expressed in grades ranging from 1 to 6 as shown in above Tables 12 to 15.

As apparent from the foregoing, according to the method of and system for evaluating tactile sensations of car seat covers using an artificial neural network, consistent and objective evaluation results can be obtained through only a simple process in which mechanical and thermal/physiological characteristics of the detected seat covers is measured with a measuring system, and the physical quantity of the measured characteristics is acquired without receiving any effect of features of individual evaluators unlike an existing subjective evaluation method.

In addition, the present invention can contribute to the development of high-sensitivity interior seat covers and the making of more luxurious of automobiles, escaping from a development environment of cars that is biased toward improvement of durability.

FIG. 9 is a block diagram illustrating a tactile sensation evaluation system 900 in accordance with some embodiments. The tactile sensation evaluation system 900 typically includes one or more processing units (CPU's) 902, one or more network or other communications interfaces 904, memory 906, and one or more communication buses 908 for coupling these components. The tactile sensation evaluation system 900 optionally may include a user interface 910 comprising a display device 912 and a keyboard/mouse 914. The memory 906 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 906 may optionally include one or more storage devices remotely located from the CPU(s) 902. In some embodiments, the memory 906 stores the following programs, modules and data structures, or a subset thereof:
- an operating system 918 that includes procedures for handling various basic system services and for performing hardware dependent tasks;
- a communication module 920 that is used for coupling the tactile sensation evaluation system 900 to other computers or to one or more testing/measuring apparatuses via the one or more communication interfaces 904;
- a statistical recursive model 922, which may include a number of expressions for quantitatively evaluating a number of tactile sensations for car seat covers based on measured physical characteristic factors for the car seat covers;
- an artificial neural network model 924 for quantitatively evaluating whether a car seat cover is "high-class" or "sporty" with regard to males and females;
- a tactile sensation evaluation module 926, for quantitatively evaluating the tactile sensations of car seat covers using the statistical recursive model 922 and for quantitatively evaluating whether a car seat cover is "high-class" or "sporty" using the artificial neural network model 924;
- a result presentation module 932 for formatting the quantitative data for visual presentation;
- a seat cover type selection module 934 for receiving user input of a selection of the car seat cover type; and
- numerical values to grade tables 936 for corresponding quantitative numerical values for tactile sensations or sensations of "high-class" and "sporty" to grades.

The tactile sensation evaluation module 926 may include a quantitative numerical value module 928 that determines the quantitative numerical values for the tactile sensations and the sensations of "high-class" and "sporty." The tactile sensation evaluation module 926 may also include a grading module 930 for converting the determined quantitative numerical values to grades in accordance with the numerical values to grade tables 936.

In some embodiments, the memory 906 may also include a characteristic factor input module (not shown) that can receive manual user input of characteristic factor input values or receive the values from testing/measuring apparatuses 916.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 906 may store a subset of the modules and data structures identified above. Furthermore, memory 906 may store additional modules and data structures not described above.

Although FIG. 9 shows a "tactile sensation evaluation system," FIG. 9 is intended more as functional description of the various features which may be present in a set of one or more computers than as a structural schematic of the embodiments described herein. In practice, and as recognized by those of ordinary skill in the art, items shown separately could be combined and some items could be separated. For example, some items shown separately in FIG. 9 could be implemented on single computers and single items could be implemented by one or more computers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of evaluating tactile sensations of a car seat cover, comprising:
    identifying a type of the car seat cover;
    obtaining values for one or more physical characteristic factors of the car seat cover in accordance with the identified type of the car seat cover;
    quantitatively evaluating a first set of tactile sensations with regard to the type of the car seat cover, including determining quantitative numerical values of the first set of tactile sensations based on the one or more physical characteristic factors including mechanical and thermal/physiological characteristic factors input to a statistical recursive model for the evaluation of a corresponding tactile sensation of the first set;
    grading the mechanical and thermal/physiological characteristic factors and the determined quantitative numerical values of the first set of tactile sensations, yielding a first set of grade values;
    quantitatively evaluating a second set of tactile sensations with regard to the type of the car seat cover, including setting the quantitative numerical values of the first set of tactile sensations as input values, subjecting the set input values to an artificial neural network model for the evaluation of a corresponding tactile sensation of the second set, and determining quantitative numerical values of the second set of tactile sensations;
    grading the determined quantitative numerical values of the second set of tactile sensations, yielding a second set of grade values being within a predetermined range; and
    displaying the first and second sets of grade values,
    wherein the identified type of car seat cover comprises a leather type, and wherein the values for the mechanical and thermal/physiological characteristic factor values comprise values for at least one of the group consisting of: S(Softness), μ(sliding resistance coefficient), RB(bending resilience (%)), RT(tensile resilience (%)), P(moisture vapor permeability(mg/cm$^2$/hr)) and q$^{max}$(maximum value of initial heat flux (J/cm$^2$·sec)).

2. The method of claim 1, wherein the second set of tactile sensations comprises sensations of "sporty" and "high-class" with regard to males and females.

3. The method of claim 1, wherein grading the mechanical and thermal/physiological characteristic factors and the quantitative numerical values of the first set of tactile sensations comprises grading the characteristic factors and the quantitative numerical values of the first set of tactile sensations based on a point of subjective equality.

4. The method of claim 1, wherein the first set of tactile sensations comprises at least one of the group consisting of: Leather Soft ($L_S$), Leather Elastic ($L_E$), Leather Sticky ($L_K$), Leather Coolness to the touch ($L_C$), and Leather thermal and humid ($L_H$).

5. The method of claim 1, wherein quantitatively evaluating the first set of tactile sensations comprises developing the statistical recursive model, including converting the characteristic factor values of S, μ, RB, RT, P, and q$^{max}$ into characteristic factors of S, μ, $$\sqrt{RB\sqrt{RT}},$$

log P and q$_{max}$.

6. The method of claim 5, wherein the statistical recursive model comprises the following expressions:

Leather Soft($L_S$)=−8.5567+3.0429×S;    (1)

Leather Elastic ($L_E$) = −9.8916 + 0.67713× $\sqrt{RB\sqrt{RT}}$ ;    (2)

Leather Sticky($L_K$)=−5.1694+15.664×μ;    (3)

Leather Coolness to the touch($L_C$)=−6.751+46.519× $q_{max}$; and    (4)

Leather thermal and humid($L_H$)=2.0589−2.2927×log P.    (5)

7. A method of evaluating tactile sensations of a car seat cover, comprising:
identifying a type of the car seat cover;
obtaining values for one or more physical characteristic factors of the car seat cover in accordance with the identified type of the car seat cover;
quantitatively evaluating a first set of tactile sensations with regard to the type of the car seat cover, including determining quantitative numerical values of the first set of tactile sensations based on the obtained one or more physical characteristic factors including mechanical and thermal/physiological characteristic factors input to a statistical recursive model for the evaluation of a corresponding tactile sensation of the first set;
grading the mechanical and thermal/physiological characteristic factors and the determined quantitative numerical values of the first set of tactile sensations, yielding a first set of grade values;
quantitatively evaluating a second set of tactile sensations with regard to the type of the car seat cover, including setting the quantitative numerical values of the first set of tactile sensations as input values, subjecting the set input values to an artificial neural network model for the evaluation of a corresponding tactile sensation of the second set, and determining quantitative numerical values of the second set of tactile sensations;
grading the determined quantitative numerical values of the second set of tactile sensations, yielding a second set of grade values being within a predetermined range; and
displaying the first and second sets of grade values,
wherein the identified type of car seat cover comprises a cloth type, and
wherein the values for the mechanical and thermal/physiological characteristic factor values comprise values for at least one of the group consisting of: SMD (surface roughness), RC (compression resilience), RB (bending resilience (%)), RT (tensile resilience (%)), B (bending rigidity (gf cm$^2$/cm)), To (thickness), q$^{max}$ (maximum value of initial heat flux (J/cm$^2$·sec)) and P (moisture vapor permeability (mg/cm$^2$/hr)).

8. The method of claim 7, wherein the first set of tactile sensations comprises at least one of the group consisting of: Cloth Soft ($C_S$), Cloth Elastic ($C_E$), Cloth Voluminous ($C_V$), Cloth Smooth ($C_S$), Cloth Coolness to the touch ($C_C$), and Cloth thermal and humid ($C_H$).

9. The method of claim 7, wherein quantitatively evaluating the first set of tactile sensations comprises developing the statistical recursive model, including converting the characteristic factor values of SMD, RC, RB, RT, B, To, q$^{max}$ and P into characteristic factors of $$\sqrt{RC\sqrt{SMD}}, \sqrt{RT\sqrt{RB}}, \log B, \sqrt{\exp T_O \sqrt{RC}},$$

q$_{max}$ and log P.

10. The method of claim 9, wherein the statistical recursive model comprises the following expressions:

Cloth Soft($L_S$)=2.4923−3.2303×log B;    (1)

Cloth Elastic ($C_E$) = −6.2558 + 0.51146× $\sqrt{RT\sqrt{RB}}$ ;    (2)

Cloth Voluminous ($C_V$) = −2.2679 + 0.60339× $\sqrt{\exp T_O \sqrt{RC}}$ ;    (3)

Cloth Smooth ($C_S$) = 14.241 − 1.02× $\sqrt{RC\sqrt{SMD}}$ ;    (4)

Cloth Coolness to the touch($C_C$)=−2.203+37.062× $q_{max}$;    (5) and

Cloth thermal and humid($C_H$)=3.4037−1.3855×log P.    (6)

* * * * *